United States Patent
Lowell

[19]

[11] Patent Number: 5,938,556
[45] Date of Patent: Aug. 17, 1999

[54] DIFFERENTIAL SPEED-SENSITIVE AND TORQUE-SENSITIVE LIMITED SLIP COUPLING

[75] Inventor: Jeffrey Lowell, Ventura, Calif.

[73] Assignee: Asha Corporation, Santa Barbara, Calif.

[21] Appl. No.: 09/114,505

[22] Filed: Jul. 13, 1998

[51] Int. Cl.[6] .................................................. F16H 48/26
[52] U.S. Cl. .................. 475/89; 475/90; 475/233
[58] Field of Search .................................. 475/84, 88, 89, 475/90, 96, 231, 236, 242, 233

[56] References Cited

U.S. PATENT DOCUMENTS

| | | | |
|---|---|---|---|
| 2,949,792 | 8/1960 | Smith | 475/234 X |
| 3,724,289 | 4/1973 | Kennicutt | 475/89 X |
| 5,059,160 | 10/1991 | Raniero | 475/234 |
| 5,299,986 | 4/1994 | Fabris et al. | 475/88 |
| 5,310,388 | 5/1994 | Okcuoglu et al. | |
| 5,536,215 | 7/1996 | Shaffer et al. | |
| 5,595,214 | 1/1997 | Shaffer et al. | |
| 5,611,746 | 3/1997 | Shaffer. | |

*Primary Examiner*—Khoi Q. Ta
*Attorney, Agent, or Firm*—Brooks & Kushman P.C.

[57] ABSTRACT

A limited slip differential gear mechanism, particularly for use with automotive vehicle axles, comprising differential side gears connected drivably to each of two driving axles for the vehicle. A pair of pressure plates splined to the carrier define a pair of opposed ramps. They are engaged by differential pinions carried by a pinion shaft. The pinions engage each of the two side gears. A friction clutch assembly is situated adjacent each side gear. The pressure plates transfer an axial component of the thrust force created on the ramp surfaces as torque is transmitted through the pinions and through each side gear to each of two axle shafts. Each friction clutch assembly includes friction disks carried by the side gears and by the carrier so that a bias torque is established as one axle shaft overspeeds the other. A hydrostatic pump has one pump member connected to the carrier and another connected to one of the axle shafts. The hydrostatic pump creates a differential speed-sensitive bias which complements the torque-sensitive bias developed by the ramps.

9 Claims, 6 Drawing Sheets

DIFFERENTIAL SPEED-SENSITIVE AND TORQUE-SENSITIVE LIMITED SLIP COUPLING

TECHNICAL FIELD

The invention relates to differential gearing for transferring torque from a driving shaft to each of two output shafts with a bias that is both torque-sensitive and speed-sensitive.

BACKGROUND OF THE INVENTION

It is known practice in the design of a geared differential mechanism for driving axles of a wheeled vehicle to provide a limited slip characteristic using friction disks to establish a controlled torque bias as driving torque is delivered from a driveshaft to the axle shafts, which in turn are connected to the traction wheels of the vehicle.

The differential gearing in conventional differentials includes a crown gear or ring gear that is connected drivably to a drive pinion. A pair of differential side gears is situated within a differential housing, one side gear being connected to one axle half shaft and the other being connected to the other axle half shaft. Differential pinions continuously engage the side gears. The pinions are mounted so that they rotate with the differential carrier housing.

In the case of a limited slip differential, the pinion shafts are mounted between two pressure rings that are splined to the differential housing. The pressure rings cannot rotate relative to the housing, but they can shift axially as torque is transmitted to the pinion shaft. The pinion shaft engages ramp surfaces on the pressure rings so that torque applied to the differential housing will be translated into an axial force on the pressure rings.

A friction clutch is situated on each side of the differential mechanism. At least one friction disk of each clutch is connected to the differential housing and at least one adjacent friction disk of each clutch is connected drivably to a separate one of the side gears. As torque is transmitted through the differential mechanism, an axial force acting on the pressure rings engages frictionally the clutch disks, thereby providing a torque bias which resists motion of the side gears relative to the housing.

The amount of the torque bias that is created in this fashion is directly related to the torque being transmitted through the engaged drive pinion and ring gear and to the geometry of the pressure rings (i.e., the ramp angles of the ramp surfaces). Similarly, the torque transmitting capacity of the clutches is directly proportional to the torque being delivered to the axial shafts.

Wheel spin is restricted because of the torque bias developed by the axial force components acting on the pressure rings. It is possible, therefore, for the vehicle to accelerate even if one traction wheel is on a low friction surface. The torque bias further reduces the possibility of skidding due to a yaw torque if the vehicle encounters a low friction surface or severe bumps.

During cornering of a vehicle equipped with a torque-sensitive limited slip differential, the innermost traction wheel maintains traction as load is transferred to the outside traction wheel of the vehicle. The torque transferred to the outermost traction wheel equals the torque developed at the innermost traction wheel multiplied by the bias ratio. This improves the steering response and reduces the possibility of understeering.

It is also known design practice to complement the driving torque-induced axial forces acting on the friction clutches with a preload spring force. This tailors the bias torque ratio to suit particular drivability requirements. The initial bias at the breakaway torque is determined by spring load.

Another design approach involves the use of a hydrostatic speed responsive torque bias. Examples of a hydrostatic limited slip differential mechanism of this kind may be seen by referring to U.S. Pat. Nos. 5,595,214, 5,611,746, and 5,536,215. Each of these patents is assigned to the assignee of the present invention.

The hydrostatic torque bias differential mechanism of the prior art patent references mentioned above is accomplished by integrating a Gerotor pump with the differential gearing of the differential mechanism. The Gerotor pump has a first pumping gear member with internal gear teeth, which register with a companion gear member with external gear teeth. The two gear members are eccentrically mounted, one with respect to the other. The internal gear member of the hydrostatic Gerotor pump has one fewer internal teeth than the number of external teeth of the companion gear member.

The Gerotor pump develops a pumping chamber between the internal and external Gerotor pump teeth, the volume of the pumping chamber being a maximum when the Gerotor pump elements are positioned to provide maximum communication with a fluid inlet port. A fluid discharge port is angularly spaced from the inlet port. As the pumping chamber decreases in volume, the communication between the inlet port and the pumping chamber is progressively interrupted as communication between the pumping chamber and the outlet port progressively increases. Fluid is circulated through the Gerotor pump when one side gear of the differential gearing rotates relative to the differential housing.

Provision is made in the hydrostatic fluid flow circuit for a controlled restriction in the fluid flow path. The energy that is developed by the pumping action of the Gerotor pump members increases as the relative speed of the differential side gear with respect to the differential housing increases.

Because the Gerotor pump is a positive displacement pump, the torque bias developed by the pump is proportional to the relative speeds of the pumping members regardless of the magnitude of the torque being transmitted through the differential.

SUMMARY OF THE INVENTION

The improved differential mechanism of the invention combines features of a torque-sensitive differential with features of a speed-sensitive differential as described in the preceding discussion. As in the case of the torque-sensitive differential previously described, the differential mechanism of the present invention includes clutch packs having friction disks that are engaged with a force that is proportional to the torque being transmitted through the differential gearing. Driving torque on the ring gear is transmitted to pressure rings, which are capable of shifting axially as axial forces are developed by cam recesses defining ramps on the pressure rings. The ramps are engaged by the differential pinions.

First and second side gears are connected to the driven members. Planetary pinions engage the side gears, and a planetary carrier housing encloses the side gears and the planetary pinions. A friction clutch disc pack has a first disc connected to the carrier housing, and a second disc connected to the adjacent side gear.

Thrust forces created by each side gear are transferred through the pressure ring to the clutch pack to create a torque-sensitive torque bias. A first positive displacement pump member is connected to a driven member, and a second pump member is connected to the carrier housing so that pumped fluid circulates through the pump to create a speed-sensitive torque bias.

The ramps are thrust apart as soon as any torque is transmitted through the differential mechanism. The magnitude of the thrust is directly proportional to the torque applied to the ring gear. The magnitude of the thrust also is a function of the ramp angle that is chosen for the pressure rings. Typically, the ramp angle chosen for acceleration has a lower slope (higher axial force) than the ramp angle chosen for establishing a torque bias during deceleration (lower axial force). The friction disk torque developed by the pressure rings resists overspeeding of one axle shaft with respect to the other.

In the case of a limited slip differential without speed-sensitivity, it is not possible to develop a high axle torque when one traction wheel rests on a very low friction surface or is airborne. A limited slip differential that depends solely on a mechanical torque bias, therefore may be subjected to a variety of operating conditions in which the effectiveness of the limited slip differential is limited.

It is an objective of the invention to enhance the effectiveness of a limited slip differential that employs a torque-sensitive bias ratio by providing a hydrostatic torque bias in which the overall effectiveness of the differential is adequate even in those instances when the driving torque is low. The total bias that is developed by the improved differential mechanism of the invention, therefore, is equal to the sum of the torque-sensitive bias and the speed-sensitive bias.

The presence of both a hydrostatic torque bias, which is speed-sensitive, and a mechanical torque bias, which is torque-sensitive, reduces the tendency of the vehicle to understeer during turning maneuvers with an advanced throttle setting.

According to another feature of the invention, the improved differential mechanism of the invention will provide a continuous torque bias even in those instances in which one of the traction wheels (e.g., the inside traction wheel) on a turning maneuver leaves the traction surface. A wheel spin-out is avoided because the hydrostatic, speed-sensitive bias continues to drive the wheel that leaves the traction surface momentarily. An undesirable yaw torque is avoided when the innermost traction wheel again engages the traction surface. The wheel that leaves the ground will have a change in speed (delta speed) which causes a hydrostatic pressure to develop. The delta speed is controlled to avoid a high wheel speed, which would cause a yaw when the wheel again engages the ground.

According to a alternate embodiment of the invention, the hydrostatic pressure that is developed by a Gerotor pump is distributed to an annular piston that acts on one or both of the friction disk assemblies to complement a torque-sensitive bias that is developed by the axial reaction forces acting on the pressure ring. The speed-sensitive bias component of the overall torque bias is developed by reason of the hydrostatic resistance in a closed fluid circuit of the Gerotor pump as well as the friction torque bias developed by the hydrostatic forces acting on the piston that engages the adjacent friction clutch. The speed-sensitive portion of the overall torque bias thus is increased because of the presence of the piston.

PARTICULAR DESCRIPTION OF THE INVENTION

Figure 1:
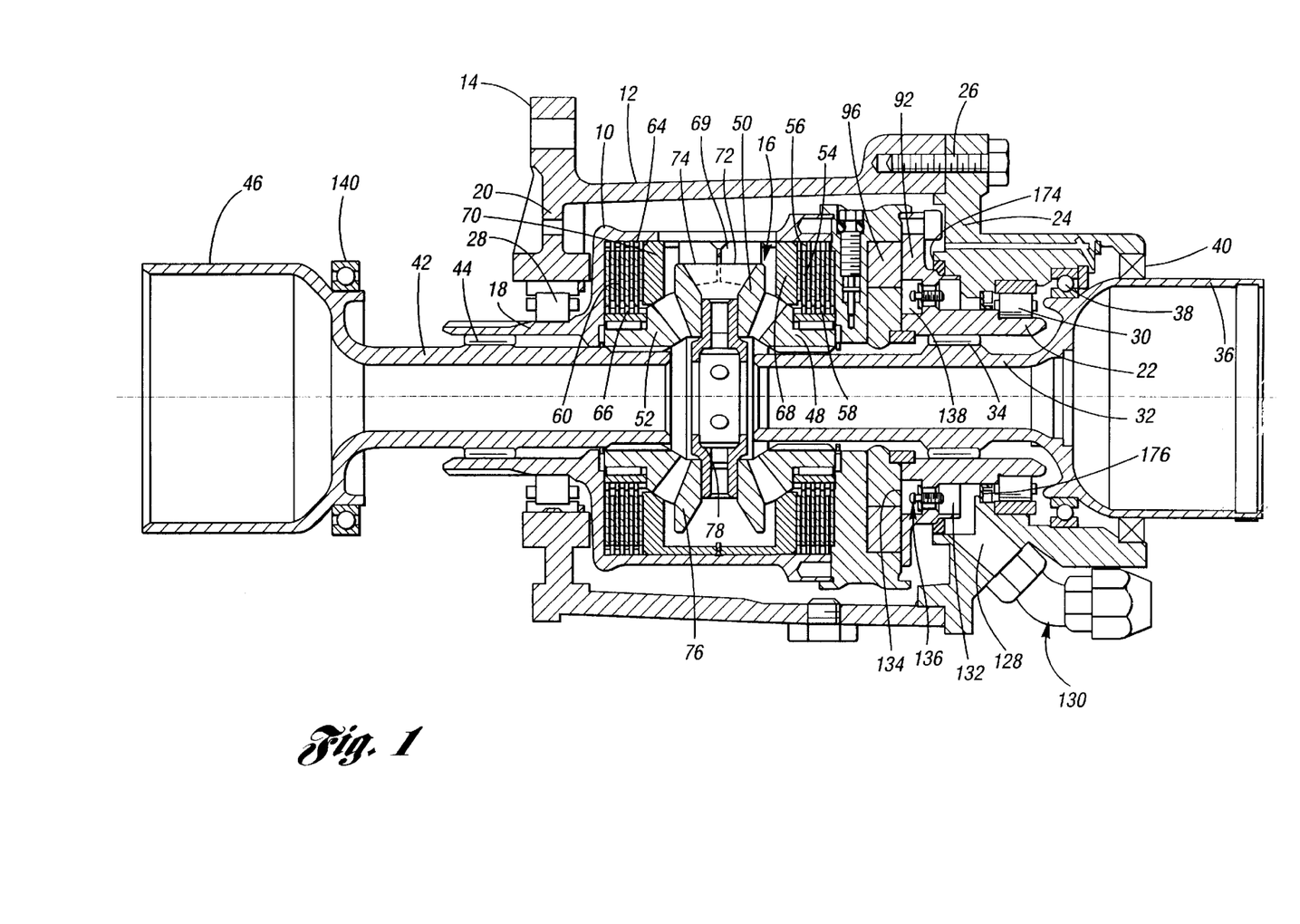
FIG. 1 is a cross-sectional view of a first embodiment of the invention wherein the limited slip differential has torque-sensitive features and speed-sensitive hydrostatic torque bias features.

FIG. 1 shows a first embodiment of the invention wherein a torque-sensitive bias and a hydrostatic speed-sensitive bias are obtained without the presence of a piston that is actuated by the hydrostatic pressure developed by a hydrostatic pump. In FIG. 1, reference numeral 10 designates a differential housing. It is rotatably journaled in the main housing 12 that forms a part of an axle assembly for the traction wheels of an automotive vehicle. Mounting flange 14 is adapted to support the housing in a transmission assembly for a vehicle, the transmission assembly not being illustrated in FIG. 1.

The housing 12 acts as a differential carrier for planetary gearing illustrated generally at 16.

The carrier housing 10 has a support shaft 18, which serves as a torque input shaft. Shaft 18 extends through a bearing opening formed in a forward wall 20 of the housing 10. A corresponding support shaft 22 extends through a bearing opening formed in end plate 24, which is secured by threaded fasteners such as bolts 26 to the right end of the housing 12. The support shaft or torque input shaft 18 is journaled in the bearing opening in the wall 20 by bearing 28. A corresponding bearing 30 journals the support shaft 22 in the bearing opening in the end plate 24.

A first torque output shaft 32 is rotatably journaled in support shaft 22 by needle bearing 34. It is adapted to be connected to the inboard end of an axle half shaft by a universal joint (not shown). The universal joint would be located in a universal joint housing 36, which is journaled in the end wall 24 by bearing 38. A fluid seal 40 isolates the interior of the housing.

The opposite side of the differential assembly includes a second output shaft 42, which is journaled by a needle bearing 44 in support sleeve shaft 18 of the carrier housing 10. The outboard end of the shaft 42, as in the case of the outboard end of the shaft 32, has a universal joint (not shown). The universal joint for shaft 42 is located within the universal joint housing 46.

The inboard end of shaft 32 is splined to differential side gear 48, which has bevel teeth that drivably engage bevel teeth on differential pinion 50. Differential pinion 50 also meshes with the bevel teeth of a second differential side gear 52, which is splined to the inboard end of the shaft 42.

A first multiple disk clutch is located directly adjacent differential side gear 48, as shown at 54. The clutch disks are arranged in interdigital relationship. Alternate disks of the clutch pack shown at 54 are splined to carrier housing 10, as indicated at 56. The other disks of the disk pack 54 are splined as shown at 58 to differential side gear 48.

A second multiple disk clutch pack 60 is located directly adjacent side gear 52. As in the case of clutch pack 54, clutch pack 60 includes externally splined disks 64 which are connected drivably to the differential carrier housing 10. Alternately spaced disks of the disk pack 60 are internally splined, as shown at 66, to a clutch element that is secured and driven by differential side gear 52.

A first pressure ring 68 is situated adjacent the disk pack 54. A corresponding pressure ring 70 is situated directly adjacent disk pack 60. Each pressure ring has cam surfaces defined by ramps. Ramps 69 on pressure ring 68 are engaged by a radial extension 72 of the pinion 50. Similarly, cam surfaces defined by ramps are formed on pressure ring 70 as shown at 74. Ramps 74 are engaged by the extension 72 of the pinion 50.

A second differential pinion 76 also engages the differential side gears 48 and 52. Pinions 76 and 50 are journaled on a pinion shaft, sometimes referred to as a "spider", as generally shown at 78. Either two, three or four pinions may be mounted on a common pinion shaft or spider, depending upon the capacity that is desired. We have shown in FIG. 1 for purposes of simplicity a pressure plate and ramp configuration for only one of the pinions, although a similar pressure plate and ramp configuration may be employed for any or all of the other pinions.

Figure 2:
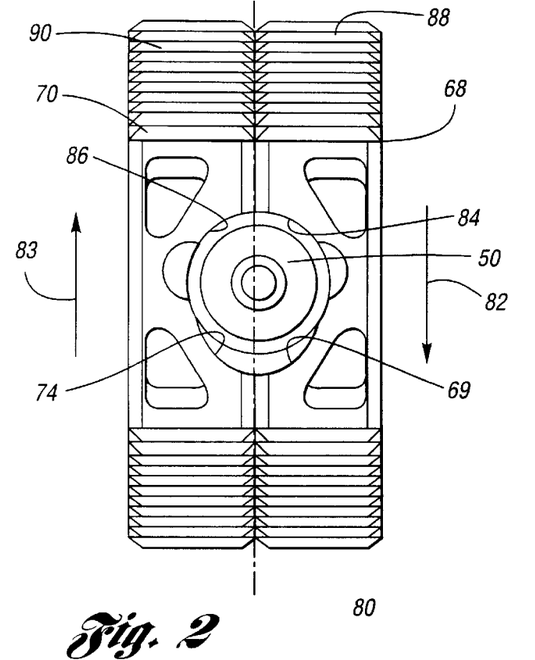
FIG. 2 is an end elevation view of the pressure rings and differential pinions in the embodiment of FIG. 1.

The pressure plate 68 has ramp surfaces 69 that are approximately oriented at 30 degrees relative to the vertical axis 80, as shown in FIG. 2. The housing 10 acts on the pressure rings. The pressure ring ramps act on the pinions. The reactive torque is in the direction of arrow 82, which causes spreading forces on the pressure rings. When the differential mechanism is subjected to acceleration torque, as indicated by the directional arrow 83 in FIG. 2, the pinion 50 will exert an axial force on the pressure ring 68 which will energize the clutch disk pack 54. Similarly, ramp 74, which is also oriented at a angle of about 30 degrees, is engaged by the pinion 50, thereby creating an axial force that energized clutch disk pack 60.

If the differential is delivering torque, the ramp 86 will be engaged by pinion 50, thereby applying an axial force on the pressure ring 70. The same is true for pressure ring 68 and ramp 84. The ramps 84 and 86 are oriented at an angle that is substantially greater than the angle of ramps 69 and 74. Thus, there is substantially less torque bias created by the differential mechanism during deceleration (see directional arrow 82) compared to the torque bias that is developed during acceleration.

The pressure ring 68 is externally splined by splines 88 to the carrier housing 10. Similarly, pressure ring 70 is externally splined by splines 90 to the carrier housing 10. The pressure rings thus are held fast against angular motion relative to the carrier housing, but axial movement of the pressure rings relative to the carrier housing is permitted by the splines.

Figure 3:
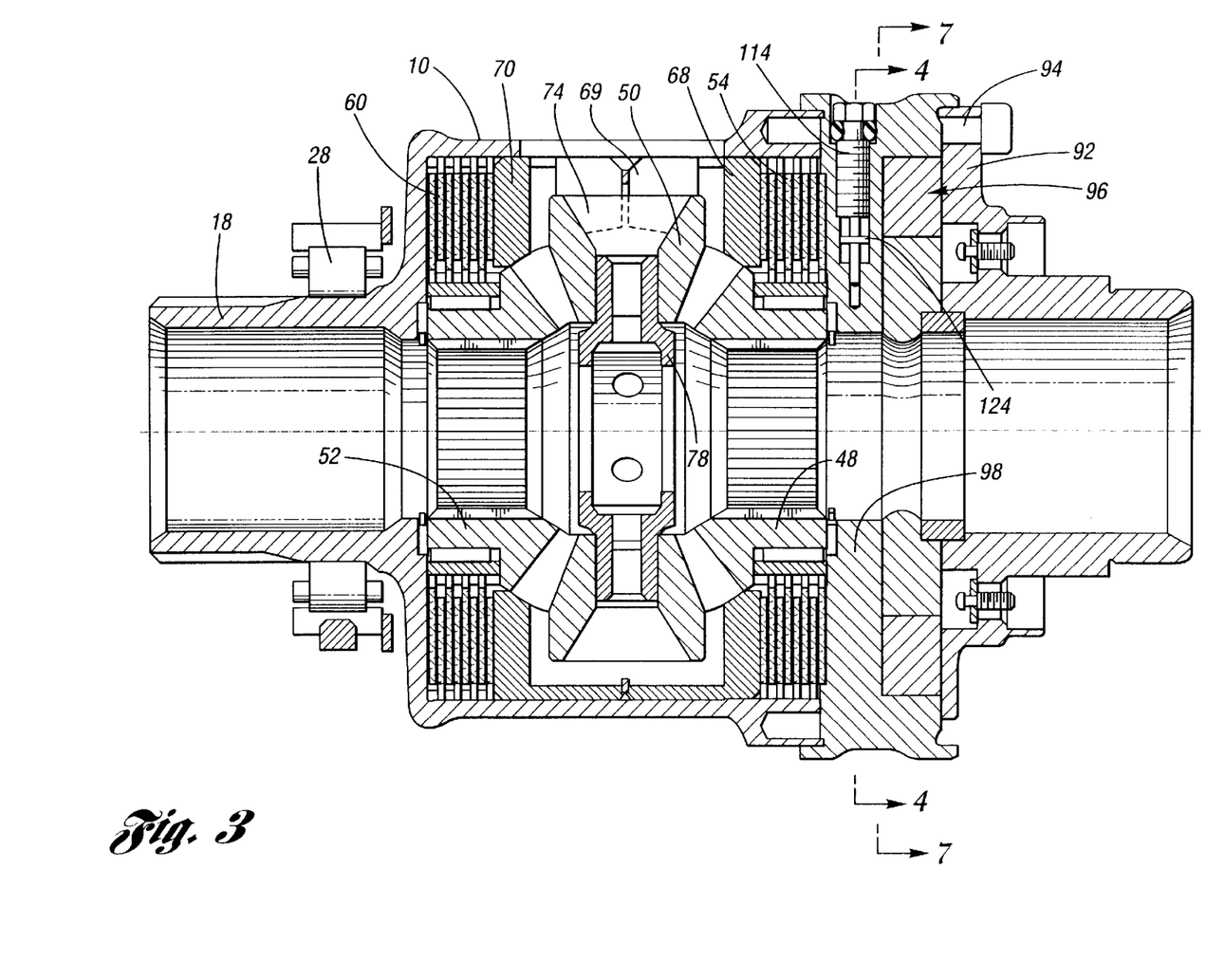
FIG. 3 is an enlarged view of the internal elements of the limited slip differential shown in FIG. 1.

As best seen in FIG. 3, the carrier housing 10 has an end plate 92, which is secured to the open end of the differential carrier housing by suitable fasteners, such as threaded fasteners 94. A positive displacement Gerotor pump assembly 96 is situated between the plate 92 and a plate 98 of the carrier housing 10. The fasteners 94 secure the plates 92 and 98 and the carrier housing 10 securely together.

Figure 7:
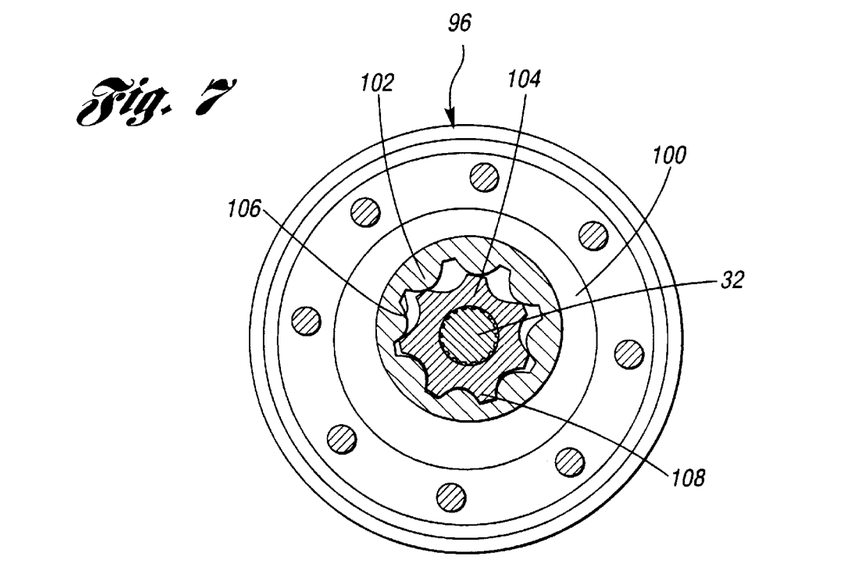
FIG. 7 is a cross-sectional view taken along the plane of section line 7—7 of FIG. 3.

The pump assembly is best seen in FIG. 7. It includes a fixed eccentric ring 100 and a first rotary pumping member 102 that is positioned eccentrically within the ring 100 relative to the axis of the differential assembly. An inner pump gear member 104 located within the pumping member 106 is positioned concentrically with respect to the axis of the differential. It is formed with internal spline teeth, which establish a driving connection with axle half shaft 32.

Pumping member 102 is circular and has internal gear tooth spaces 106. Pumping member 104 has external gear teeth 108 which register with the internal tooth spaces 106. The gear teeth 108 are one fewer in number than the number of tooth spaces 106.

The internal gear teeth and the external gear teeth of the Geroter pump are formed with involute profiles in known manner.

Figure 4:
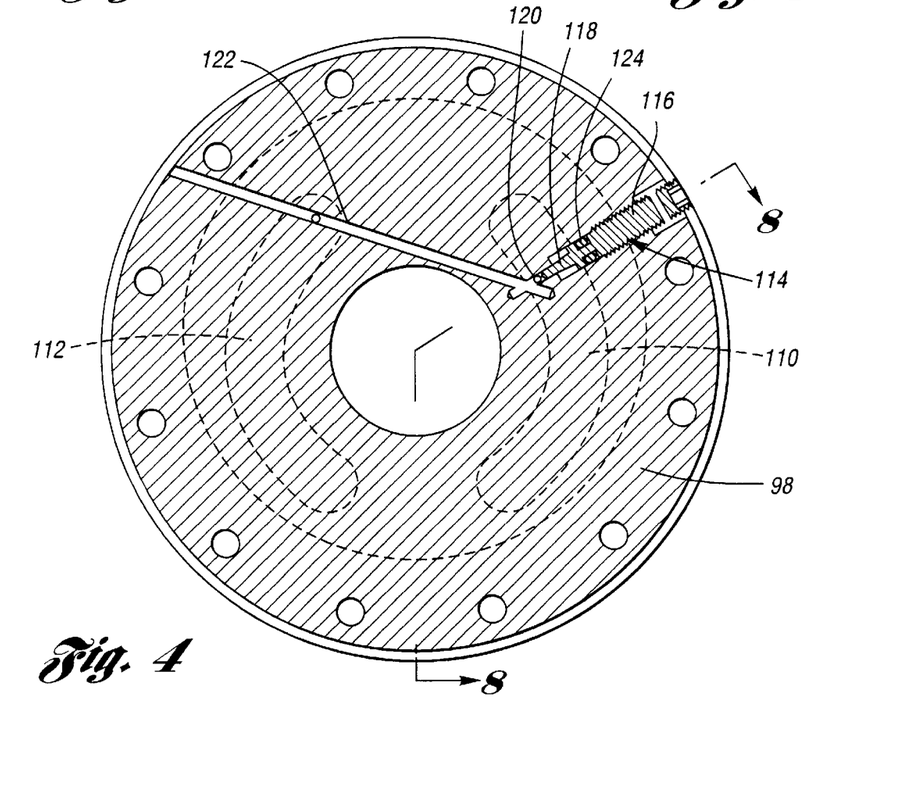
FIG. 4 is a cross-sectional view taken along the plane of section line 4—4 of FIG. 3.
Figure 5:
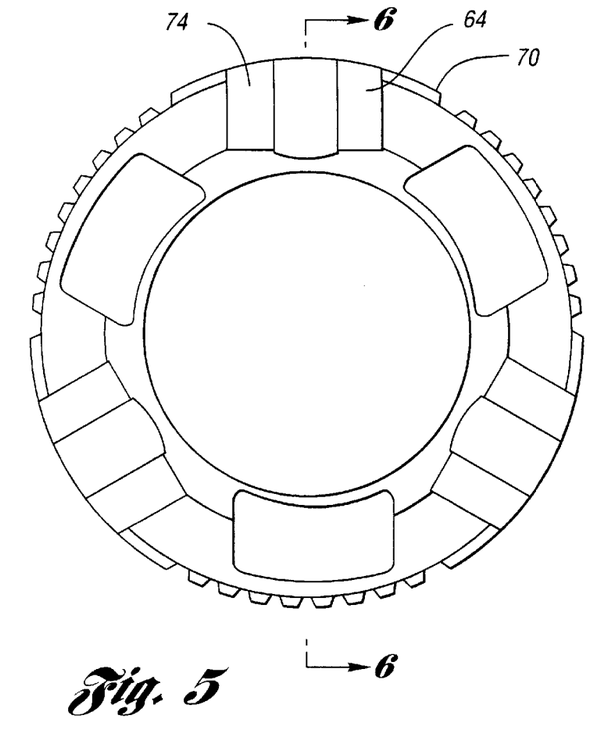
FIG. 5 is a side view as viewed in the direction of the axis of the differential assembly showing the ramp portions of one of the pressure rings of the assembly of FIG. 1.
Figure 6:
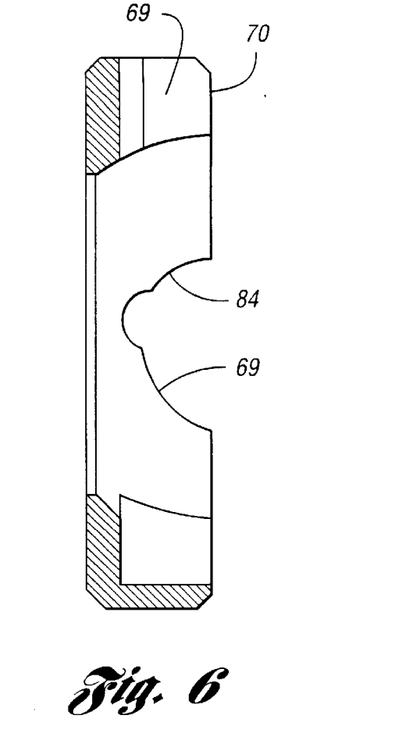
FIG. 6 is a cross-sectional view taken along the plane of section line 6—6 of FIG. 5.

The plate 98 is provided with inlet and outlet ports, seen in phantom in FIG. 4 at 110 and 112, respectively. These ports communicate with the fluid pumping chambers created by the meshing gear teeth of the pumping elements. As the pump gear 104 rotates, it drives the outer pumping member. The pumping chamber defined by the spaces between the internal and external teeth of the pumping members communicates with the outlet port during the phase of the pump rotation when the volume of the gear tooth spaces increases. Those spaces communicate with the inlet port shown at 112.

As best seen in FIG. 4, a needle valve 114 is positioned in a threaded opening in the plate 98. It includes a main body 116 which is threaded in a radial threaded opening in the plate 98. It includes also a stem 118 which registers with a flow restricting port 120 that communicates with the outlet port 110. The port 120 is in fluid communication with a cross-over passage 122, which in turn communicates with the inlet port 112. Fluid pumped by the pumping members then is transferred from the port 110 and through the flow restricting port 120 to the inlet side of the pump. This recirculation of the pumped fluid provides a hydrostatic resistance to the rotation of one pumping element relative to the other.

The flow accommodated by the cross-over passage 122 is bi-directional, the direction of flow depending on the direction of relative rotation of the pumping members 102 and 104.

Provision is made for adjusting the valve 114. This is done by rotating the valve 114 in one direction or the other depending upon whether the stem 118 is to be advanced or retracted. If it is advanced, the flow restriction increases. If it is adjusted in the opposite direction, the flow restriction at port 120 decreases. An O-ring seal 124 on the adjustable valve 114 isolates the pressurized fluid within the closed fluid flow circuit.

Figure 8:
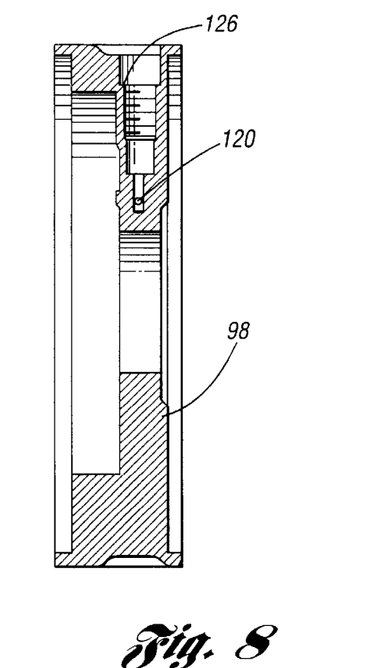
FIG. 8 is a cross-sectional view taken along the plane of section line 8—8 of FIG. 4.

FIG. 8 shows a cross-sectional view of the plate 98. The threaded radially-extending valve opening for the valve 114 is indicated in FIG. 8 by reference numeral 126.

A lubricant supply passage is shown in FIG. 1 at 128. A fluid fitting 130 is received in the passage 128. Hydraulic fluid supply for the pump is distributed to the inlet port of the pump. Communication with the inlet port is established by annular cavity 132, which in turn communicates with inlet port cavity 134 formed in the end plate 92. Flutter valves (check valves) 136 provide one-way fluid communication between the cavity 132 and the port cavity 134. They provide communication between cavity 132 and port cavity 138 when relative rotation of the pumping members is in one direction when the relative rotation reverses. This ensures pumping operation regardless of rotational direction. Cavity 132 communicates with the port 110, as best seen in FIG. 4. Port 110 is in fluid communication with valve port 120 and with cross-over passage 122 extending to the port 112 and port cavity 138. The flutter valves function in a manner similar to check valves 60 disclosed in U.S. Pat. No. 5,310,388.

Torque is distributed to the carrier housing 10 through torque input shaft 18, which is splined to a torque input ring gear. The output shaft 42, which is journaled in the shaft 18, is supported by bearing 140, which in turn is supported by differential housing portions (not shown). Bearing 140 corresponds to bearing 38 for the shaft 32.

It is seen from the foregoing that when torque is applied to the input shaft 18, the differential pinions will react against the ramps of the cam surfaces of the pressure plates 68 and 70, thereby applying the clutch disk packs. This resists any tendency for the side gears to overspeed, one with respect to the other, if the traction torque for one of the shafts 32 or 42 should be different, one with respect to the other.

If one of the traction wheels for the vehicle rests on a low friction surface, the torque component of the differential bias will diminish as one actual shaft overspeeds the other. Such overspeeding will cause the pumping members 102 and 104 to rotate with respect to each other. This creates a high hydrostatic pressure on the outlet side of the Gerotor pump, thereby absorbing energy and resisting the tendency of the shafts 42 or 32 to overspeed, one with respect to the other. The differential thus is both speed-sensitive and torque-sensitive as a torque bias is established. Further, the speed-sensitive component of the differential bias complements the torque-sensitive bias because a decrease in torque-sensitive bias will be accompanied by an increase in speed-sensitive bias. It also provides a mechanical damping effect for the torque sensitive bias because of the hydrostatic action. These features greatly improve the drivability of the differential mechanism in comparison to prior art torque-sensitive differential designs such as the differential shown in FIGS. 10 and 11. These Figures are included merely to illustrate a prior art design having torque-sensitive bias features but no speed-sensitive bias features.

Figures 10, 11:
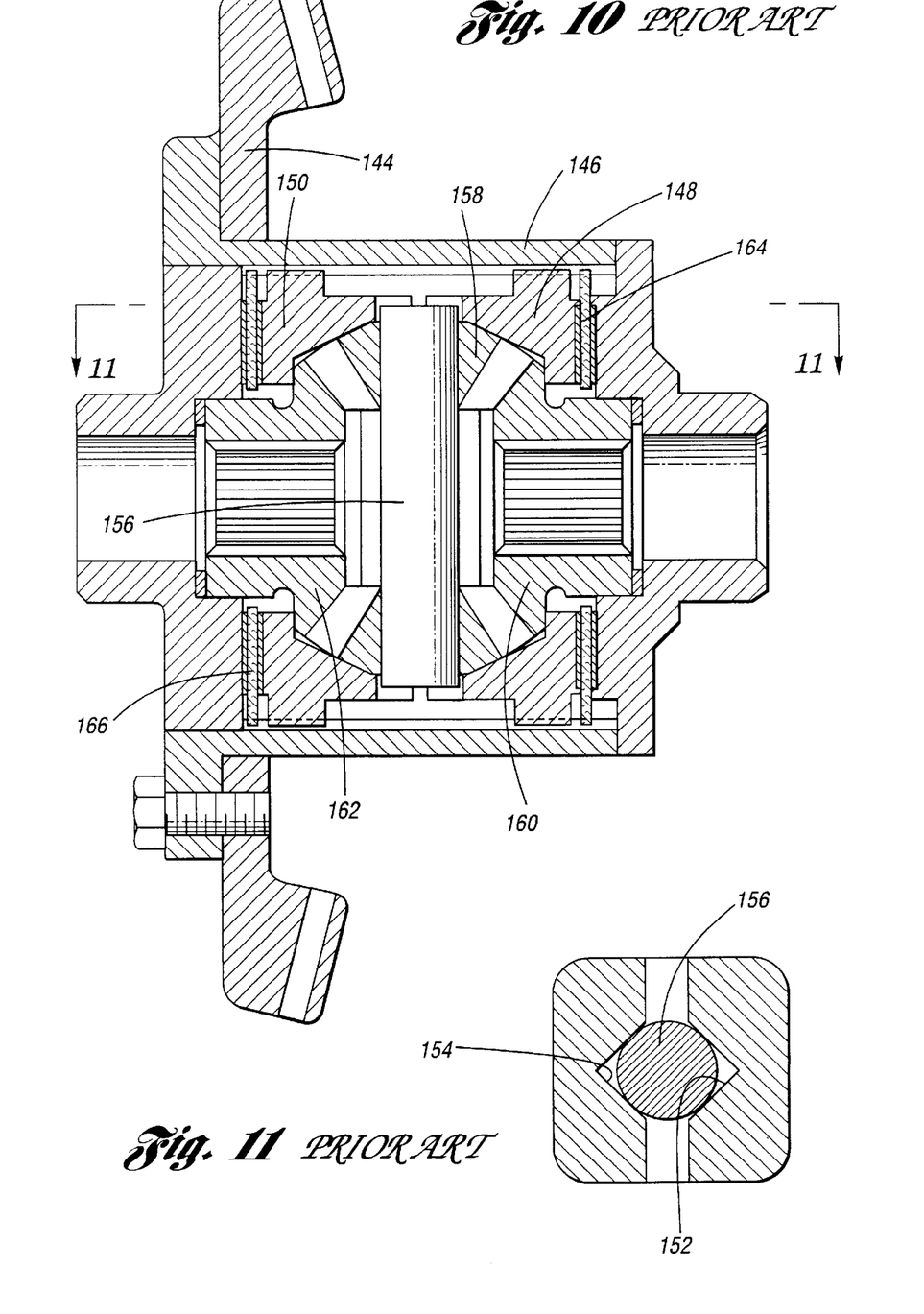
FIG. 10 is a cross-sectional view of a prior art torque-sensitive differential mechanism.
FIG. 11 is a cross-sectional view taken along the plane of section line 11—11 of the prior art differential mechanism of FIG. 10.

Referring next to FIGS. 10 and 11, a torque input ring gear 144 delivers torque to a carrier housing 146, which encloses pressure plates 148 and 150. Pressure plates 148 and 150, which are splined to housing 146, have cam surfaces as seen at 152 and 154 in FIG. 11. These cam surfaces engage pinion shaft 156. Pinions 158 engage side gears 160 and 162. As in the case of the design shown in FIG. 1, for example, the design of FIGS. 10 and 11 have friction disk clutch packs 164 and 166, which are engaged in response to axial pressure forces of the pressure rings 148 and 150. Each of the side gears is internally splined to permit a driving connection with a torque output half shaft.

As seen in FIG. 11, the ramp angles α on both sides of the pinion shaft are about 45°. Thus, the torque bias on deceleration is approximately equal to the torque bias on acceleration for the prior art design illustrated in FIGS. 10 and 11. The angle of the ramps can be tailored to meet any particular design requirement. In the example of the embodiment of FIG. 1, as previously explained, the ramp angle on the acceleration side of the pinion 50 is about 30° and the ramp angle on the deceleration side is about 45°.

Figure 9:
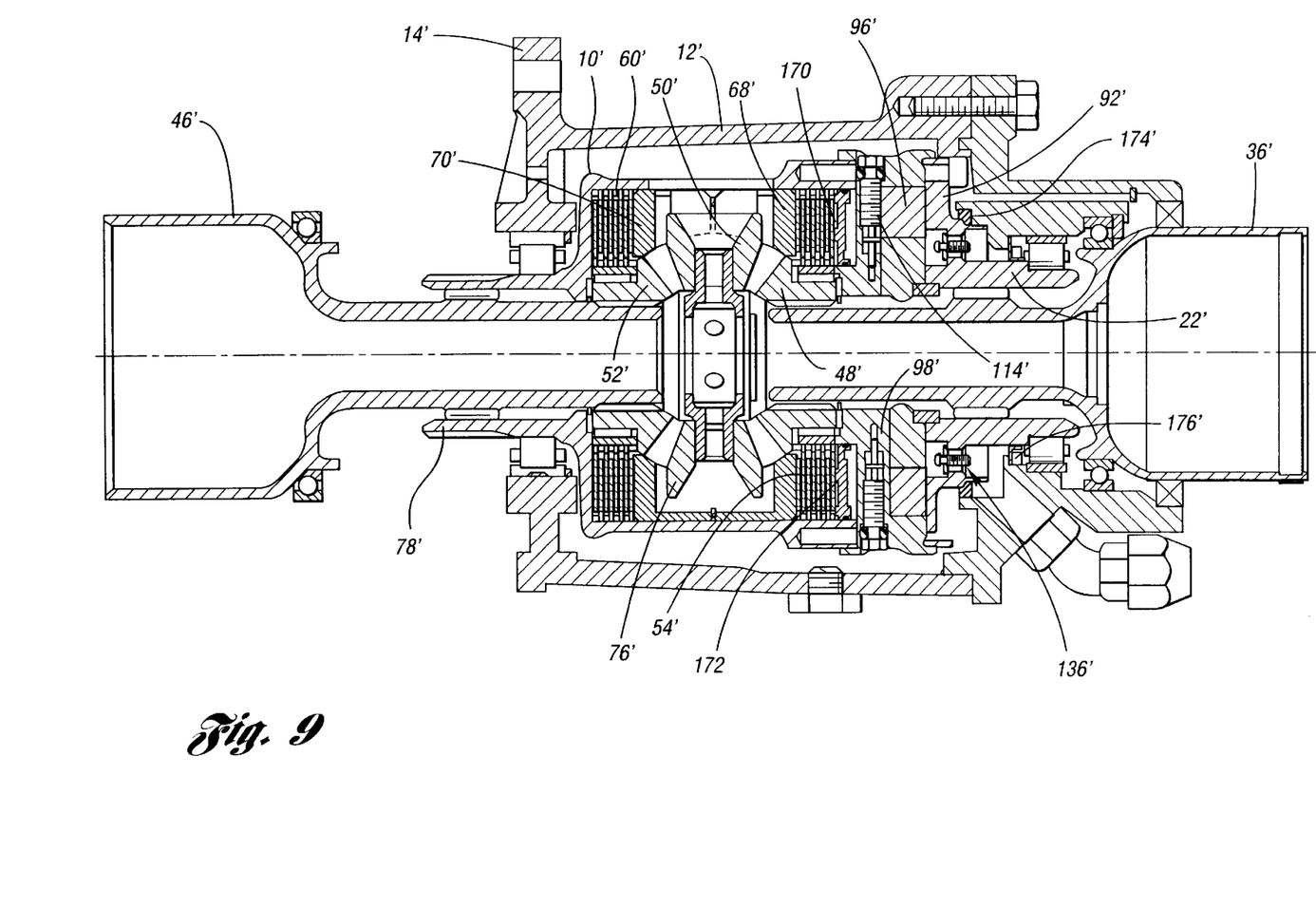
FIG. 9 is an overall cross-sectional assembly view of a second embodiment of the invention.

In the second embodiment of the invention, which is shown at FIG. 9, the discharge side of the pump is in fluid communication with a pressure chamber 170 formed in the plate 98'. The pressure chamber is in the form of an annular cylinder within which is situated annular piston 172. The chamber 170 is in fluid communication with a high pressure passage corresponding to passage 122 of FIG. 4.

The piston 172 is situated directly adjacent friction disk clutch pack 54'. The clutch pack is energized by the piston force created by the pressure in the annular chamber 170. Thus, the hydrostatic resistance offered by the pumping members of the gear pump 96' is complemented by the torque bias established by the clutch pack 54'. In this embodiment, the total torque bias is the greater of the torque sensitive bias and the hydrostatic (speed sensitive) pressure bias, plus the pumping resistance.

In FIG. 9, each of the elements that has a counterpart element in the embodiment of FIG. 1 has been identified by similar reference numerals, although prime notations are added.

In the embodiment of FIG. 9, the speed-sensitive bias would be increased relative to the speed-sensitive bias that would be available for the embodiment of FIG. 1. If, for example, a car having a differential of the kind shown in FIG. 1 were to be in a turning maneuver from right to left and if, for some reason, the inner left wheel should leave the ground or encounter a low friction surface, a torque bias still will be maintained thereby preventing excessive spin-out of the inner left wheel. When the inner left wheel re-engages the road surface, the normal tendency for the vehicle to understeer is significantly reduced. Thus, the driver has greater control of the vehicle during such turning maneuvers.

In both of the embodiments of FIGS. 1 and 9, the hydrostatic fluid for the pump is isolated from the fluid within the differential housing 12 or 12' by fluid seals. These are shown in FIG. 1 at 174 and 176. They are shown in FIG. 9 at 174' and 176'.

The torque bias can be tuned by means of an orifice and an orifice valve in the piston as disclosed in U.S. Pat. No. 5,595,214. Further tuning can be effected using the threaded adjustment valve seen in FIG. 4 at 114. U.S. Pat. No. 5,595,214, as well as U.S. Pat. Nos. 5,536,215; 5,310,388; and 5,611,746 are assigned to the assignee of the present invention and are incorporated herein by reference.

Although particular embodiments have been described, it will be apparent that modifications to the designs may be made by persons skilled in the art without departing from the scope of the invention. Such modifications and all equivalents thereof are included within the scope of the following claims.

What is claimed is:

1. A geared differential mechanism for delivering torque from a driving member to each of two driven members;

a first side gear connected drivably to one driven member and a second side gear connected to the other driven member;

at least one planetary pinion engaging drivably each side gear, a pinion shaft on which said planetary pinion is rotatably mounted;

a differential carrier housing enclosing said side gears and said planetary pinion;

at least one friction disk clutch pack having a first disk secured drivably to said carrier housing and a second disk secured drivably to one of said side gears;

at least one pressure ring in said carrier housing surrounding said one side gear, a cam recess in said pressure ring defining a ramp surface, said one planetary pinion being disposed axially adjacent said ramp surface;

axial thrust forces acting on said one side gear being transferred through said pressure ring to said one clutch pack thereby engaging said one clutch pack and creating a torque-sensitive bias in said differential mechanism;

a positive displacement pump comprising a driving pump member connected drivably to said one driven member and a driven pump member connected drivably to said carrier housing; and a pump fluid inlet port and a pump fluid outlet port, a fluid delivery passage connecting said inlet and outlet ports whereby pumped fluid recirculates through said pump as said carrier housing and said one driven member rotate relative to each other, whereby a speed-sensitive bias is established in said differential mechanism, the total torque bias being the sum of said torque-sensitive bias and said speed-sensitive bias.

2. A differential mechanism with limited slip capabilities for transferring torque from a driving member to first and second driven members;

first and second side gears connected respectively to said first and second driven members;

at least two planetary pinions engaging drivably to each of said side gears, said planetary pinions being journaled on a common pinion shaft;

a differential carrier housing enclosing said side gears and said planetary pinions;

at least one friction disk clutch pack having a first disk secured to said carrier housing and a second disk secured to one of said driven members;

at least one pressure ring in said carrier housing surrounding one side gear, a cam recess in said pressure ring defining a ramp surface, one planetary pinion being disposed axially adjacent said ramp surface;

axial thrust forces acting on said one side gear being transferred through said pressure ring to said one clutch pack thereby engaging said one clutch pack and creating a torque-sensitive bias in said differential mechanism;

a positive displacement pump comprising a first pump member connected drivably to said one driven member and a second pump member drivably connected to said carrier housing;

a pump fluid inlet port and a pump fluid outlet port, a fluid delivery passage connecting said inlet and outlet ports whereby pumped fluid recirculates through said pump as said carrier housing and said one driven member rotate relative to each other, whereby a speed-sensitive bias is established in said differential mechanism; and valve means for providing a controlled flow restriction for pumped fluid as fluid is transferred from said inlet port to said outlet port.

3. The geared differential mechanism as set forth in claim 1 including a hydraulic fluid supply passage communicating with said pump inlet port whereby a continuous supply of hydraulic fluid is available to said positive displacement pump.

4. The geared differential mechanism as set forth in claim 2 including a hydraulic fluid supply passage communicating with said pump inlet port whereby a continuous supply of hydraulic fluid is available to said positive displacement pump.

5. A geared differential mechanism for delivering torque from a driving member to each of two driven members;

a first side gear connected drivably to one driven member and a second side gear connected to the other driven member;

at least one planetary pinion engaging drivably each side gear, a pinion shaft on which said planetary gear is rotatably mounted;

a differential carrier housing enclosing said side gears and said planetary pinion;

at least one friction disk clutch pack having a first disk secured drivably to said carrier housing and a second disk secured drivably to one of said side gears;

at least one pressure ring in said carrier housing surrounding said one side gear, a cam recess in said pressure ring defining a ramp surface, said one planetary pinion being disposed axially adjacent said ramp surface;

an annular cylinder formed in said carrier housing, an annular piston in said annular cylinder, said annular cylinder and said piston defining a clutch pressure chamber, said friction disk clutch pack being located adjacent said annular piston, the latter engaging said clutch pack when said pressure chamber is pressurized;

axial thrust forces acting on said one side gear being transferred through said pressure ring to said one clutch pack thereby engaging said one clutch pack and creating a torque-sensitive bias in said differential mechanism;

a positive displacement pump comprising a driving pump member connected drivably to said one driven member and a driven pump member connected drivably to said carrier housing; and a pump fluid inlet port and a pump fluid outlet port, a fluid delivery passage connecting said outlet port to said clutch pressure chamber, whereby a speed-sensitive bias is established in said differential mechanism, the total torque bias being the greater of said torque-sensitive bias and said speed-sensitive bias, as applied to said clutch pack, plus hydrostatic pumping resistance of said pump.

6. The geared differential mechanism as set forth in claim 5 including a hydraulic fluid supply passage communicating with said pump inlet port whereby a continuous supply of hydraulic fluid is available to said positive displacement pump.

7. The geared differential mechanism as set forth in claim 1 wherein said cam recess defines two ramp surfaces, each ramp surface having a discrete ramp angle whereby an axial force component of forces acting on said pinion during torque transfer through said differential in one direction are of a different magnitude than an axial force component of forces acting on said pinion during torque transfer through said differential in the opposite direction.

8. The differential mechanism as set forth in claim 2 wherein said cam recess defines two ramp surfaces, each ramp surface having a discrete ramp angle whereby an axial force component of forces acting on said pinion during torque transfer through said differential in one direction are of a different magnitude than an axial force component of forces acting on said pinion during torque transfer through said differential in the opposite direction.

9. The differential mechanism as set forth in claim 5 wherein said cam recess defines two ramp surfaces, each ramp surface having a discrete ramp angle whereby an axial force component of pinion forces acting on said pinion during torque transfer through said differential in one direction are of a different magnitude than an axial force component of pinion forces acting on said pinion during torque transfer through said differential in the opposite direction.

* * * * *